Aug. 9, 1960 W. P. FRANKENSTEIN 2,948,455
CARTON
Filed June 18, 1951 7 Sheets-Sheet 1

INVENTOR.
WILLIAM P. FRANKENSTEIN
BY Joseph A. Rave
Attorney

Aug. 9, 1960 W. P. FRANKENSTEIN 2,948,455
CARTON
Filed June 18, 1951 7 Sheets-Sheet 5

INVENTOR.
WILLIAM P. FRANKENSTEIN
BY
Joseph A. Rave
Attorney

Aug. 9, 1960    W. P. FRANKENSTEIN    2,948,455
CARTON
Filed June 18, 1951    7 Sheets-Sheet 6

INVENTOR.
WILLIAM P. FRANKENSTEIN
BY
Joseph A. Rave
Attorney

Aug. 9, 1960 W. P. FRANKENSTEIN 2,948,455
CARTON
Filed June 18, 1951 7 Sheets-Sheet 7

INVENTOR.
WILLIAM P. FRANKENSTEIN
BY
Joseph A. Rave
Attorney

United States Patent Office 2,948,455
Patented Aug. 9, 1960

2,948,455

CARTON

William P. Frankenstein, 7260 E. Lawn Ave., Cincinnati, Ohio

Filed June 18, 1951, Ser. No. 232,145

9 Claims. (Cl. 229—36)

This invention relates to improvements in cartons and method of making same, particularly to improvements in knocked-down cartons, that is, cartons or boxes in such condition that they can be readily set up by the user without the use of permanent fastening devices or adhesive.

The principal object of the present invention is the provision of a knocked-down carton which sets up to have an integral cover and a platform intermediate the cover and the bottom of the carton.

Another object of this invention is the provision of a knocked-down carton in which the goods in the carton may be observed through the integral lid while resting on or retained in position by a platform within the carton.

A further object of this invention is the provision of a carton constructed in accordance with and for performing the functions of the above objects but wherein the article may be observed from several sides, in other words, wherein the article, with the cover of the carton closed, can be fully observed while resting on or being retained in position by the carton platform.

A still further and specific object of the present invention is the provision of a carton for accomplishing the foregoing objects which has unusual rigidity and strength to serve as a shipping carton without affecting its construction and usefulness as a display container.

A still further object of the present invention is the provision of a carton for accomplishing the foregoing objects which is formed of a single blank of card or paper board material, or other foldable material, that is economical to produce and acquire for thereby making the improved carton of the present invention available for articles or goods that would ordinarily not support the cost of attractive display and shipping cartons.

A further object of the present invention is the provision of a method for forming a knocked-down carton from a single blank which can be readily set up, and which carton includes a bottom, an integral cover, and a platform, or false bottom, intermediate the upper and lower ends of the carton walls.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 18 is a perspective view of a partially erected portion of a carton from the blank fragment of Fig. 17.

Throughout the several views of the drawings similar reference characters are employed to denote the same or similar parts.

There is illustrated in the drawings several modifications of the underlying principles of the present invention and which modifications will be described in succession by having pointed out the distinctions or modifications in succeeding blanks over the preceding blank. The resulting carton or box from each of the several modifications has substantially the same exterior appearance except that the object or material within the carton and resting on or being held in position by the platform thereof is viewable from either the top, the top and front, or the top and rear of the box or carton. Each modification is, however, of a box or carton that in and of itself is formed from a single blank.

Specifically, and referring first to Figs. 1 to 5, inclusive, there is illustrated a blank 26 cut and scored by suitable dies to provide a rectangular panel 27 bounded by score or fold lines 28, 29, 30 and 31, and which panel 27 forms the bottom for the erected carton. The score or fold lines 28 and 30 constitute, what may be termed, the ends of the panel 27 and respectively integrally, hingedly connect with the panel 27 similar extensions 32 and 33 which in the erected carton form the end walls thereof.

Figure 1:
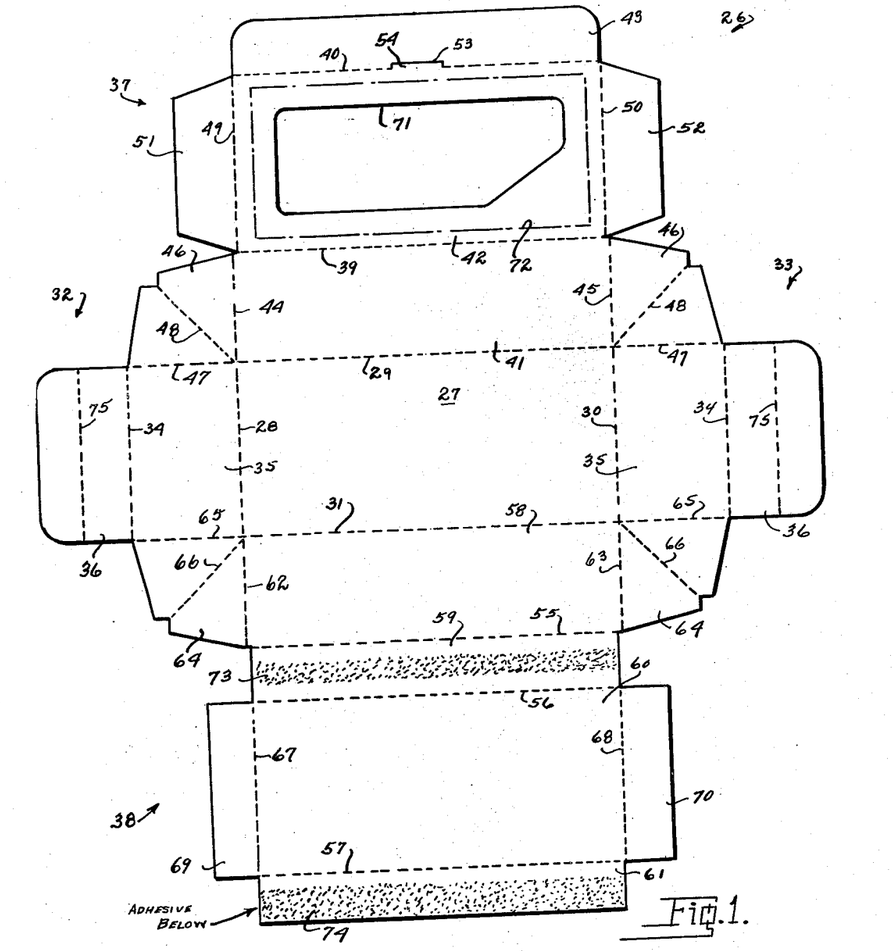
Fig. 1 is an extended plan view of a blank from which a carton embodying the principles of the present invention may be erected.

Since the extensions 32 and 33 are substantially duplicates of one another it is deemed sufficient if but one of them be described in detail, accordingly, extension 32 is provided transversely thereof with a score or fold line 34 forming in said extension panels 35 and 36 which in the erected carton constitute, respectively, an end wall outer wall member and an end wall inner wall member.

The score or fold lines 29 and 31 may be designated the sides of the bottom panel 27 and as indicating the sides of the subsequently formed box or carton with said score or fold lines respectively, integrally, hingedly connecting with the bottom panel 27 extensions 37 and 38. The extension 37 is provided with longitudinal score or fold lines 39 and 40 thereby providing in said extension panels 41, 42 and 43. In the erected carton the panel 41 forms a side wall, preferably, from a nomenclature point of view, the back wall, having the ends defined by score or fold lines 44 and 45 which are in alignment with the carton end scores 28 and 30. The score or fold lines 44 and 45, respectively, hingedly, integrally connect with the panel 41 a similar flap 46, which in practice is generally designated as a bellows corner piece. Each bellows corner piece has another edge connected, through a score or fold line 47, with an adjacent end of a blank panel, or end wall outer wall member, 35. To enable the bellows corner pieces 46 to fold on themselves with a bellows fold each is provided with a diagonal score or fold line 48. The panel 42, in the erected carton, forms the lid, cover, or top and has its ends defined by score or fold lines 49 and 50, respectively, integrally, hingedly connected with the top panel 42 a flap 51 and 52 which form side flanges for the top adapted to be inserted within the carton for retaining the said lid, cover, or top in closed position. The panel 43, connected with the top panel 42 through the score or fold line 40, likewise forms a flange for the lid or top at the front edge thereof and is insertable within the erected carton as will subsequently be made clear. The score or fold line 40 at substantially its longitudinal mid-point is interrupted and formed as an offset cut 53 thereby forming a tongue 54 integral with the cover panel 42 for limiting the closing of said cover on the erected carton, as will subsequently be made clear and as clearly illustrated in Fig. 5.

The extension 38, similar to the extension 37, is provided with a plurality of score or fold lines 55, 56 and 57 forming in said extension, panels 58, 59, 60 and 61. In the erected carton the panel 58, similar to the panel 41 of extension 37, forms the carton side wall, preferably, in the usual nomenclature of the user, the front. The panel 58 has its ends defined by score or fold lines 62 and 63, respectively, integrally, hingedly connecting with the ends of the panel 58 a similar flap 64, or bellows corner piece, each of which has another edge, similar to the flap 46, integrally, hingedly connected with an adjacent end of the carton end wall outer wall member or blank panel 35 by a score or fold line 65. To permit the said bellows corner pieces 64 to be folded bellowswise, each is provided with a diagonal score or fold line 66. In the erected carton the panel 59 forms a spacer panel for spacing the front edge of the platform panel 60 below the upper end of the carton. The panel 60, as noted above, forms the carton platform having its longitudinal edges defined by score or fold lines 67 and 68. The score or fold lines 67 and 68, respectively, integrally, hingedly connect with the platform panel 60 flaps 69 and 70 which form end spacers are supports. The remaining panel 61 of the blank forms a glue flap for adhesively securing the rear edge of the platform panel to the carton back wall or blank panel 41.

As seen in Fig. 1 the carton top or panel 42 is provided within its side and end edges with an opening 71 which may take any suitable and desirable configuration and is not limited to that specifically illustrated.

After the blank has been cut and scored as just described and illustrated in Fig. 1, the opening 71 in the carton lid or top 42 is covered by a piece of transparent material such as a sheet of cellulose by having the edges thereof secured to the said carton top 42 outwardly of the opening 71. The said cellulose material is illustrated in phantom lines in Fig. 1 and in solid lines in Figs. 2, 3, 4 and 5 and indicated by the reference numeral 72.

Adhesive 73 is applied to the spacer panel 59 and the blank is folded along the score or fold line 55 for thereby bringing said adhesive 73 into contact with the panel 58 and securing said parts to one another. The folding of the blank on the score or fold line 55 also superimposes the platform panel 60 on the panels 58 and 27 and at the same time disposes the panel 61 is superimposed relation on the panel 27. Adhesive 74 is on the now exposed face of the said glue flap 61 and the blank is folded on the score or fold line 29 for thereby bringing the adhesive 74 into contact with the carton back or blank panel 41 and pressure is applied for securing the parts to one another. The blank is now in its folded or knocked-down position as illustrated in transverse cross-section in Fig. 2. It is in this folded position that the knocked-down carton is shipped to the user. The complete process of folding the blank into its knocked-down position will be subsequently described.

Figure 2:
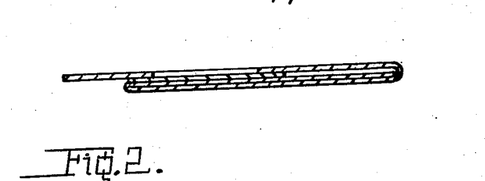
Fig. 2 is a transverse sectional view through the blank of Fig. 1 after same has been folded to its knocked-down position for shipment to the ultimate user.

The user in desiring to set up the carton does so by applying pressure to the right and left hand ends of the knocked-down blank as illustrated in Fig. 2 thereby causing the side walls, the front and back walls, or panels 41 and 58 to be raised from their horizontal positions to be disposed normal to the bottom panel 27 with the platform panel 60 upwardly spaced from the bottom panel but parallel therewith. The cover or top is then raised to the position illustrated in Fig. 3 to permit access to the supporting or spacer panels 69 and 70 of the platform, whereupon they are turned or bent to depend from the said platform. The raising of an extension, extension 33 for example, causes the bellows corner pieces 46 and 64 to be folded on themselves on their respective diagonal folds 48 and 66 whereupon the panel 36 is turned to depend within the carton and to be inserted behind its adjacent edge 68, of the platform panel 60. In order to assist in the insertion of the panel 36, end wall inner wall member, behind the platform panel 60, the said panel 36 is provided with a score or fold line 75 thereby permitting the said panel 36 to be, in effect, rolled behind the platform panel end. The second end wall, extension 32, is now erected in the same manner as just described for the extension 33.

Figures 3, 4, 5:
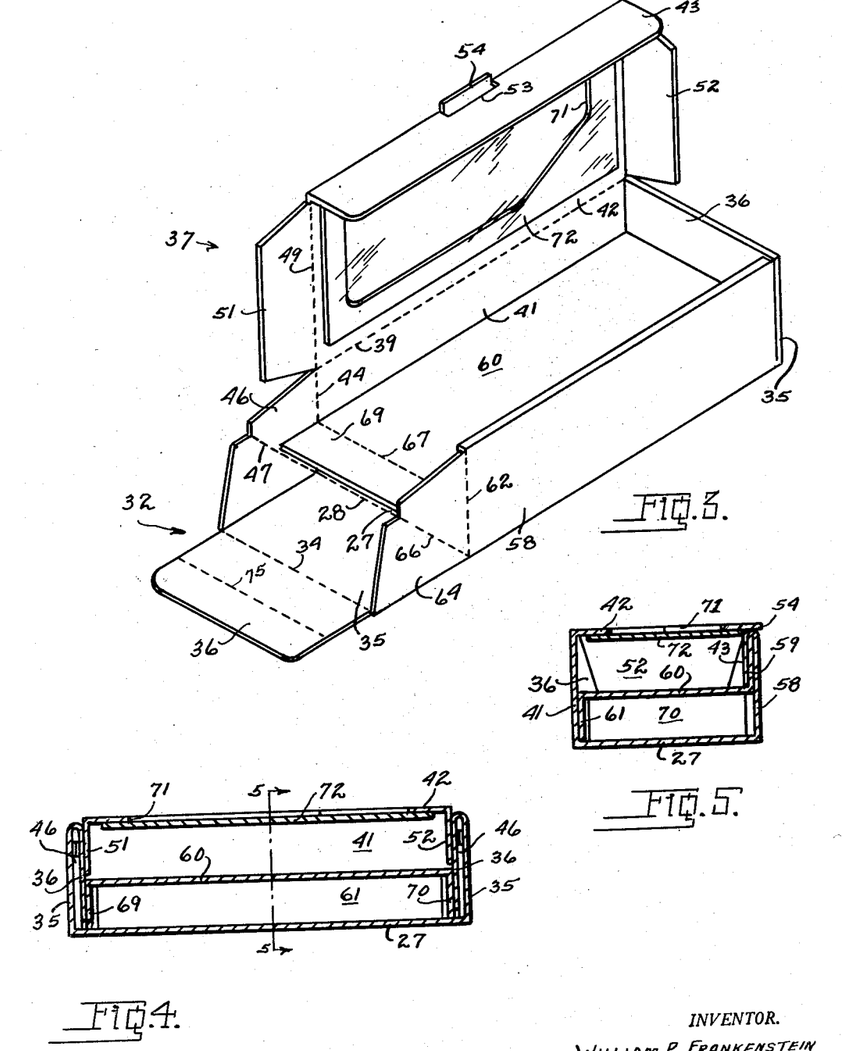
Fig. 3 is a perspective view of a partially erected or set up carton from the knocked-down blank of Fig. 2.
Fig. 4 is a longitudinal, substantially central, sectional view of a completely erected carton such as illustrated in Fig. 3.
Fig. 5 is a transverse sectional view through the erected carton of Fig. 3 as seen, for example, from line 5—5 on Fig. 4.

The cover flanges 43, 51 and 52 are now bent on their respective score and fold lines to be normal to the cover panel 42 whereupon the carton is in erected condition as illustrated by the upper or right-hand end of Fig. 3 with the said cover having the tongue 54 projecting forwardly thereof. The cover is closed as illustrated in Figs. 4 and 5 by inserting the cover flanges to be within the box or carton and when the cover is in its final closed position its tongue 54 rests on the upper edge of the carton front wall as illustrated in Fig. 5.

It will be noted that there has been provided a box or carton having a platform intermediate its ends with an integral cover which is of extremely simple construction and yet of a rigid or sturdy construction to withstand the stresses and strains to which a box or carton of this nature is subjected. The cover being provided with a window permits observation of the goods within the box or carton and disposed on the platform 60. It is to be understood that the platform may be provided with an opening or seat relative to which the goods are positioned to prevent displacement thereof during shipping as is usual construction with boxes heretofore used that are provided with a platform intermediate the height of the front and back walls.

Figures 8, 9, 10, 11, 12:
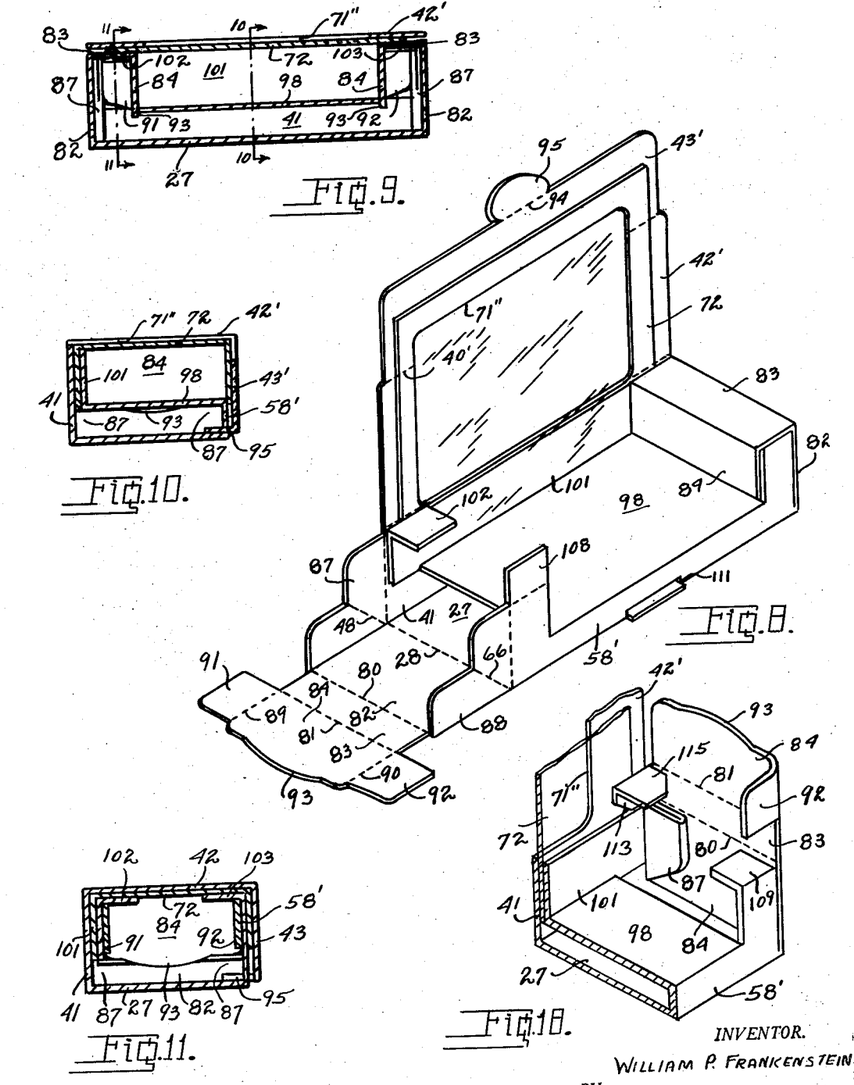
Fig. 8 is a perspective view of a partially erected carton from the knocked-down blank of Fig. 7.
Fig. 9 is a longitudinal sectional view through a completely erected carton such as illustrated in Fig. 8.
Fig. 10 is a transverse sectional view through the erected carton as seen from line 10—10 on Fig. 9.
Fig. 11 is a transverse sectional view similar to Fig. 10 taken through a plane to one side of that of Fig. 10 as seen, for example, from line 11—11 on Fig. 9.
Fig. 12 is a fragmentary plan view of a portion of a blank similar to that illustrated in Fig. 1 showing modification therein over that of Fig. 8 for producing a modified carton including the principles of the present invention.
Figure 12:
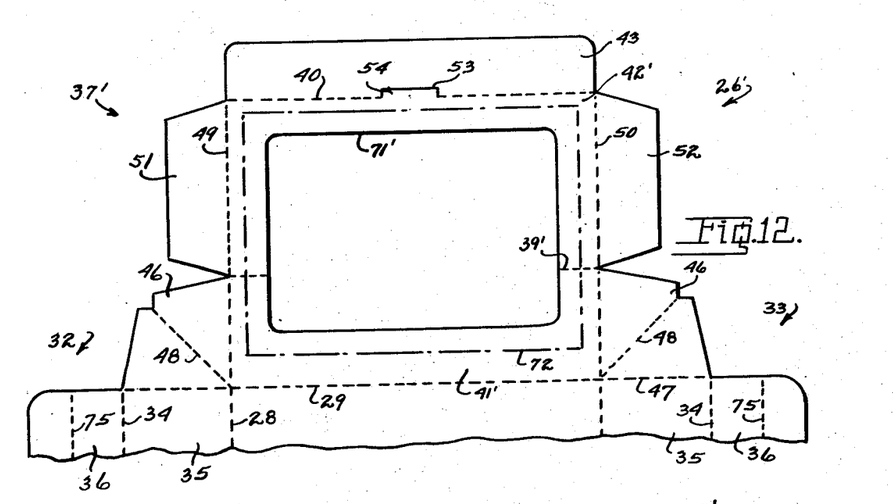
Figure 13:
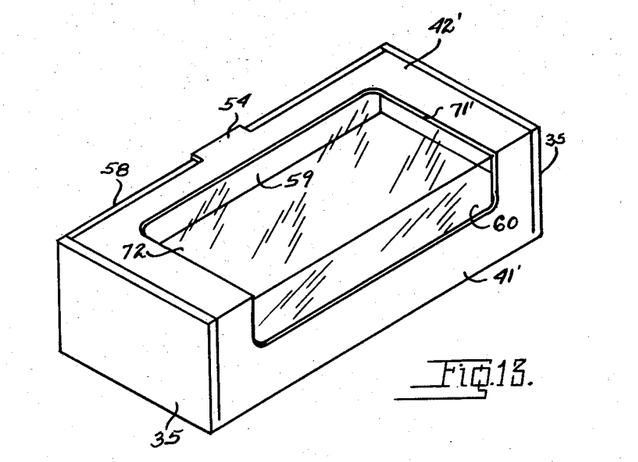
Fig. 13 is a perspective view of an erected carton from the blank of Fig. 12.
Figure 14:
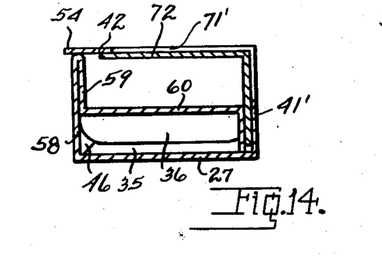
Fig. 14 is a transverse sectional view taken substantially centrally of Fig. 13.

The modification of the box or carton as illustrated in Figs. 12, 13 and 14 consists primarily in extending the opening 71 in the cover panel 42 to extend into the side wall or box or carton back wall panel 41'. A sheet of cellulose 72 is employed to cover this opening which has its ends crossing the score or fold line 39' between the modified carton or box back panel 41' and its cover panel 42'.

The modified blank 26' of Fig. 12 is otherwise the same as illustrated in Fig. 1 and is folded to its knock-down position in the same manner and resulting in a knocked-down carton substantially identical with that illustrated in Fig. 2.

The modified carton is erected in exactly the same manner as the erection of the carton from the blank of Fig. 1 resulting in a box or carton as illustrated in Fig. 13. As will be seen from Fig. 13 the goods or article on its platform panel 60 may be observed from either the top or from the rear, or through the top and through the rear or back, of the box or carton and without raising the lid or cover.

By this construction there is provided a box or carton which can be economically produced for the purpose of displaying a boxed or housed article from several sides.

Figure 6:
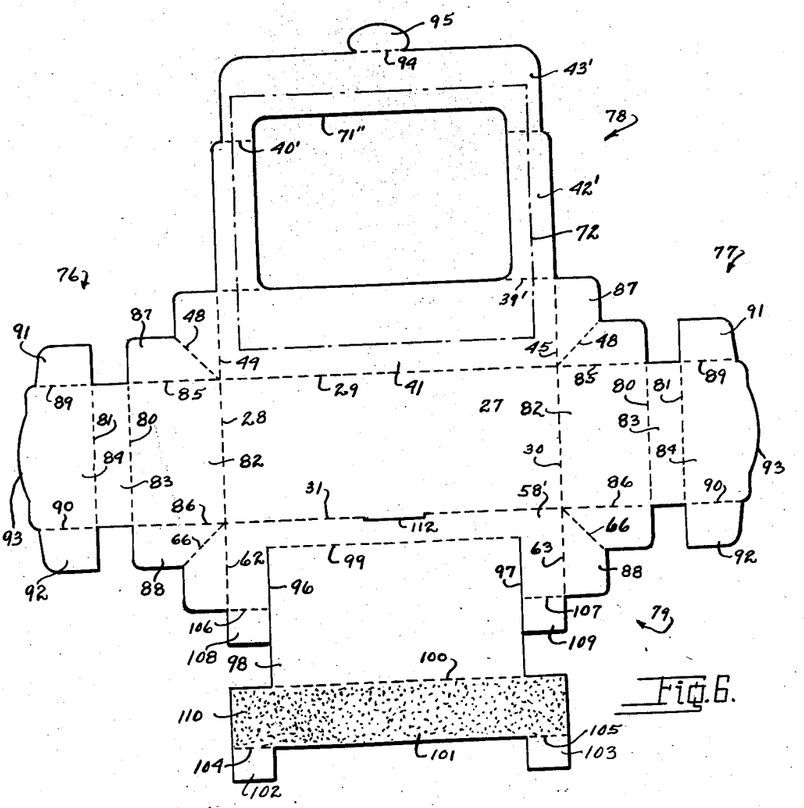
Fig. 6 is a view similar to Fig. 1 of an extended blank showing modifications over Fig. 1 from which a modified carton may be erected.

The modified blank of Fig. 6 and the resulting carton of Figs. 8 to 11, inclusive, enables the article or goods therein to be observed from or through the front as well as through the top as distinguished from the carton of Fig. 13. In addition, the carton of Fig. 8 has its end walls formed of a hollow construction which includes an inner wall member and an outer wall member spaced from one another an appreciable distance. The blank of Fig. 6 therefore has considerable modification over that illustrated in Fig. 1 and includes the central panel or box or carton bottom 27 bounded by score or fold lines 28, 29, 30 and 31, with said score or fold lines 28 and 30 integrally, hingedly connecting with the bottom panel, end wall extensions 76 and 77, and with said score or fold lines 29 and 30 integrally, hingedly connecting with the bottom panel the extensions 78 and 79.

The end walls extensions 76 and 77 are substantial duplicates of one another and it is deemed sufficient if but one of them be described in detail. Accordingly, extension 76 is provided with a pair of fold or score lines 80 and 81 thereby providing panels 82, 83 and 84. In the erected carton the panel 82 forms the end wall outer wall member and has its ends defined by score or fold lines 85 and 86 which respectively, integrally, hingedly connect with the end wall outer wall member, or panel, 82 bellows corner pieces 87 and 88. In the erected carton the panel 83 forms the end wall top wall member, while the panel 84 forms the end wall inner wall member. The panel 84 has its ends defined by score or fold lines 89 and 90 which respectively, integrally, hingedly connect with the panel 84 spacer flaps 91 and 92. The panel 84 is of an effective height less than the panel 82 and is provided at its free end with a projection or lip 93 for locking the end wall in erected position as will be subsequently described.

The extension 78 is substantially identical with the extension 37 in Fig. 1 and includes the panel or back wall member 41 having its ends defined by score or fold lines 44 and 45 which integrally, hingedly connect with the panel 41 the adjacent edge of the bellows corner pieces 87. The bellows corner pieces 87, similar to the bellows corner pieces 46 each have a diagonal fold line 48 for the purpose of effecting the folding of the said pieces on themselves. The extension 78 further includes a panel 42 or carton top which has integrally, hingedly connected with its free end through the score or fold line 40 the flap 43, indicated in Fig. 6 by the reference character 43'. The top panel 42 has its opening 71" extending into the cover flange 43' whereby, as will be subsequently made clear, the article or goods within the container may be viewed from the front of the container instead of the back, as above set forth in connection with the modification in Figs. 12–14. In the erected carton from the modification in Fig. 6 the cover flange 43' is disposed exteriorly of the box or carton instead of interiorly thereof and is locked in this position, for which purpose the said cover flange 43' has integrally, hingedly connected therewith, through the score or fold line 94, a locking tab 95.

The extension 79 includes all of the elements of extension 38 except for the platform spacer panel 59, since the platform of Fig. 6 is formed in part from the carton front wall as will presently appear. Specifically, the extension 79 of Fig. 6 includes the carton front wall or panel 58' having its ends defined by score or fold lines 62 and 63 which integrally, hingedly connect with the panel 58' the adjacent edges of bellows corner pieces 88 with said corner pieces each being provided with the diagonal score or fold line 66. Inwardly of the ends of the panel or carton front wall 58' it is provided with cut lines 96 and 97 which define the ends of the platform panel 98. The platform panel 98 is therefore of less length than the carton bottom panel 27 and cover panel 42, as distinguished from the blank of Fig. 1 which has these members of substantially equal length. The platform panel 98 is shorter than the panel 27 by the combined widths of end wall spacer panels 83 so that said platform, 98, extends between the end walls inner wall members. The platform panel 98 has its one end defined by a score or fold line 99, which joins the ends of the cut lines 96 and 97, with said score or fold line 99 spaced from the score or fold line 31 the desired distance for raising the platform panel above the carton bottom panel 27. By this construction there is provided a panel strip between the score lines 31 and 99 which, together with the ends of the panel 58', respectively located between the score or fold line 62 and cut line 96 and the score or fold line 63 and cut line 97, form a front wall for the carton substantially U-shaped in elevation. The other side of the platform panel 98 is defined by a score or fold line 100 which integrally, hingedly connects therewith a glue flap 101. The glue flap 101 is of a length substantially equal to the length of the box or carton and has projecting from its free side for a short distance inwardly of its ends spacer flaps 102 and 103 respectively, integrally, hingedly connected with the glue flap through score or fold lines 104 and 105.

The carton front wall or blank panel 58' has the free ends of its U-shaped arms defined by score or fold lines 106 and 107 which respectively, integrally, hingedly connect with the panel 58' spacer tabs 108 and 109.

After the blank has been cut and scored as illustrated in Fig. 6 a sheet of transparent cellulose 72 is secured in position to cover the opening 71" in the carton top panel 42 and top panel flap 43'. The extension 79 is subsequently folded on the score or fold line 31 for superimposing the parts of the blank below the said score or fold line, as seen in Fig. 6, onto the parts thereabove and aligning the free end of the glue flap 101 with the score or fold line 39' between the carton back or blank panel 41 and the cover panel 42 and which score line 39' is coincident with the edge of the opening 71 in the said cover panel 42, thereby bringing the adhesive 110, on the glue flap 101, into engagement with the panel or carton back 41, actually into contact with the cellulose 72 which was previously secured to said carton back 41. This folding of the extension 79 superimposes or aligns the score lines 104 and 105 with the said score or fold line 39'. The extension 78 is folded on the score or fold line 39' to superimpose the parts of the blank thereabove on the superimposed portions of the blank therebelow. The blank is now in its carton knocked-down position as illustrated in Fig. 7 for shipment to the user.

Figures 7, 16:
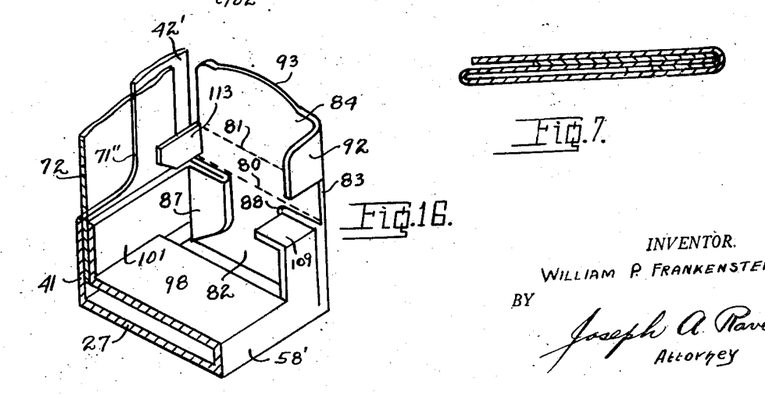
Fig. 7 is a transverse sectional view of the blank of Fig. 6 in its knocked-down position as shipped to the user for erection.
Fig. 16 is a perspective sectional view of a partially erected carton from the blank fragment of Fig. 15.

The user in desiring to set up the knocked-down blank of Fig. 7 follows the same steps as above, namely, applies pressure to the right and left-hand ends of Fig. 7 thereby swinging the carton back and front walls to be normal to the carton bottom or panel 27 and at the same time disposing the bottom panel, platform panel and cover panels in spaced parallel relation. The user now sets up the end walls of the carton by first extending the spacer tabs 102—108 or 103—109 toward one another as illustrated for the spacer tab 108 in Fig. 8. The end wall extension is then raised which automatically bellows-folds the bellows corner pieces and disposes the end wall outer wall member normal to the carton bottom. The end wall outer wall member spacer flaps 91 and 92 are then folded to be normal to said end wall outer wall member whereupon the end wall extension is folded to dispose the spacer panel 83 on the spacer side wall lugs and the inner wall member is folded to depend vertically from the said spacer wall member until the tongue 93 is snapped behind the adjacent edge of the platform panel 98. The carton or box is now in the erected position illustrated in Fig. 8 with the front wall substantially cut away and which front wall is completed upon the closing of the carton top panel or cover 42 with the cover flange 43' locked in position by inserting its locking lug 95 into the slit 111 formed substantially centrally of the carton by the cut 112 formed in the carton front wall panel 58'.

It will now be appreciated that the box or carton of Fig. 8 is provided with end walls of appreciable width or thickness with said end walls having its inner and outer wall members amply braced in spaced apart relation. It will further be noted that any goods or article on the platform is readily observable from the top and front through the transparent window 72 and opening 71" in said carton top or cover panel and its flange 43'.

Figure 15:
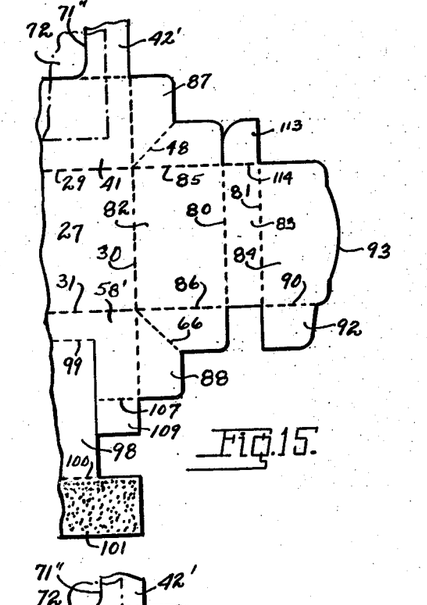
Fig. 15 is a plan view of a fragment of a blank showing modifications therein over that illustrated in Fig. 6.
Figure 17:
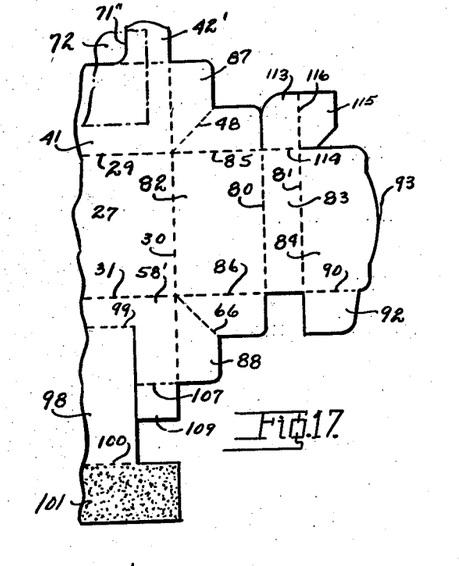
Fig. 17 is a plan view of a fragment of a blank similar to Fig. 15 showing additional modifications in the blank.

In the modifications illustrated in Figs. 15 and 16 and in Figs. 17 and 18 the changes consist in merely shifting the spacing and reinforcing tabs for the spaced apart end walls.

In Fig. 15 the spacing tabs 102 and 103 are eliminated from the glue flap 101 and the spacing tab 91 is eliminated from the end of blank panel 84, the end wall inner wall member of the erected carton. In the place of these spacing tabs use is made of a single spacing tab 113 connected with the blank panel, erected carton end wall spacer member, 83 through a score or fold line 114. As illustrated in Fig. 16 this spacer tab 113 limits the movement of the end wall spacer member 83 by engagement with the end wall outer wall member, actually by engagement with the bellows corner piece 87 when in its folded position. The folding of the end wall inner wall member is likewise limited by engagement of its remaining spacer tab 92 when in its outwardly extending position and disposed below the end wall spacer panel or top wall member 83.

The modification in Figs. 17 and 18 includes the addition of a spacer tab 115 integrally, hingedly connected with the spacer tab 113 through a score or fold line 116. This additional spacer tab 115 is additionally employed for holding the end wall inner wall member against displacement toward its outer wall member as obvious from Fig. 18.

Figure 19:
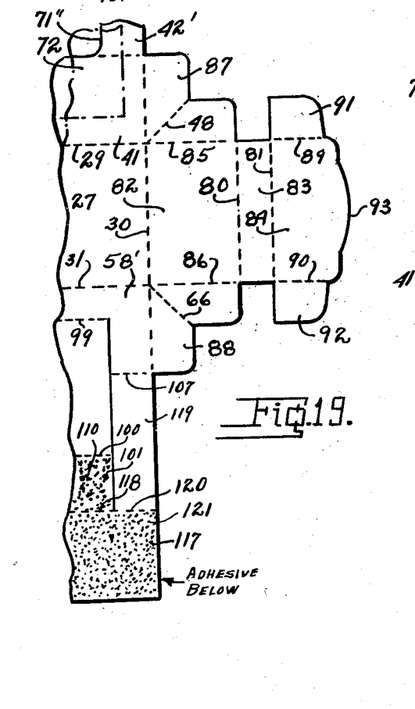
Fig. 19 is a plan view of a fragment of a blank similar to Fig. 15 showing a further modification in the blank.
Figure 20:
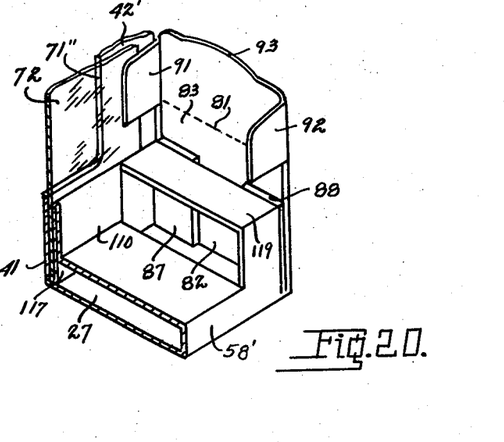
Fig. 20 is a perspective view of a portion of a carton erected from the blank fragment of Fig. 19.

The modification in Figs. 19 and 20 establishes a bridging piece between the carton box front and back walls around which the end walls outer wall member, spacer member or top wall member, and inner wall member are folded with the tucking and spacer flaps 91 and 92 of the inner wall member interlocked therewith. In order to effect this construction the blank of Fig. 16 includes a glue flap 117 in addition to the glue flap 101 with said glue flaps integrally, hingedly connected to one another by a score or fold line 118. The portion of the glue flap 117 extending beyond the ends of the platform panel 98 has integrally, hingedly connected therewith the panel or bridge 119 through a score or fold line 120. The other end of the panel 119 is connected with the box or carton front wall, blank panel 58' through the score or fold line 107, wherefore the said panel 119 takes the place of the spacer flap 109.

The blank of Fig. 19 is folded on the score or fold lines 118—120 to bring one face of the glue flap 117 into engagement with the adhesive 110 on the glue flap 101 whereupon adhesive 121 is applied to the now exposed face of the glue flap 117 and the blank then folded as above set forth on the score or fold line 31.

The erection of the knocked-down blank brings the parts to the position illustrated in Fig. 20 with the panel 119 acting as a tie or bridge between the upper ends of the carton or box front and back members for a distance inwardly of the ends thereof whereupon the end wall extensions 76 and 77 are actuated for enclosing said bridging piece and causing the spacer lugs 91 and 92, at the ends of the end wall inner wall members, to interlock beneath the said bridging pieces or panels 119 as readily understood from the disclosure in Fig. 20.

In order that the box or carton will readily erect from its knocked-down position in Fig. 2 or Fig. 7 it is necessary that certain of the score or fold lines be prefolded or broken, that is, the material of the blank folded at least part way prior to the securing of said blanks in their folded knocked-down positions. The process or method of doing this is clearly disclosed in Figs. 21, 22 and 23 and which process or method will now be described; the method is illustrated in connection with the blank of Fig. 1 as modified in Fig. 12.

Figure 24:
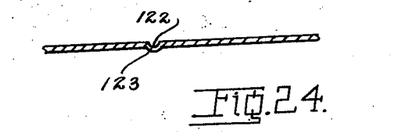
Fig. 24 is a fragmentary sectional view of a portion of a blank forming a detail of the invention.

A score or fold line may take various forms but generally is a line of demarcation in the blank material slightly weakened, or predisposed, so that the material will readily bend or fold therealong. In Fig. 24 there is illustrated, in exaggerated form, a fold or score line as most generally employed and as illustrated consists of a depressed line into and below one surface of the material without, however, breaking either the said surface of the material or the fibers thereof. As illustrated, the score line is formed as an arcuate depression 122 from the upper surface of the material or blank and as an arcuate projection 123 from the lower surface thereof.

Figure 21:
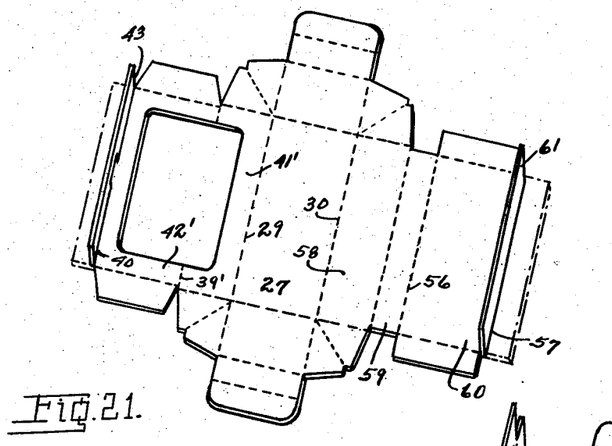
Figs. 21, 22 and 23 are respectively perspective views of a blank illustrating successive steps in the process of preparing the blank for ultimate securement in carton knocked-down condition.
Figure 22:
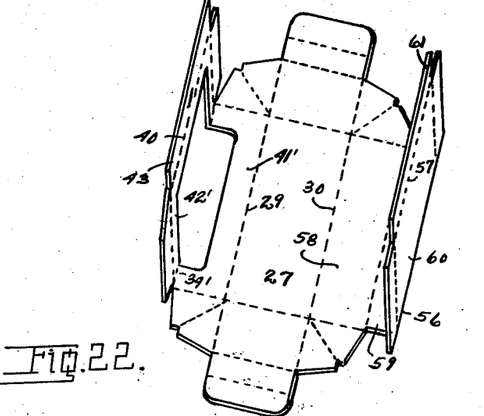
Figure 23:
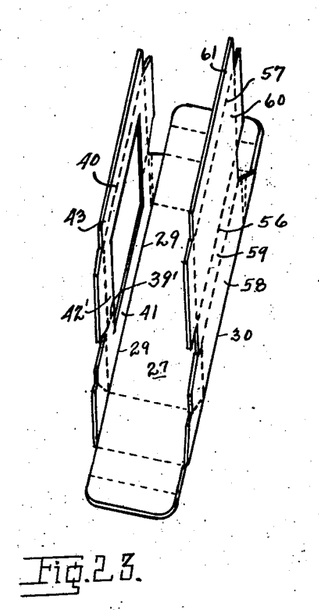

After the blank has been cut and scored and, in those instances where a window is formed in the cover and either prior to or after the covering of the window opening with the transparent cellulose sheet, the blank is passed through a machine to have the flaps outwardly of the score or fold lines 40 and 57 raised to be normal to the balance of the blank as illustrated in solid lines in Fig. 21. These parts, namely, panel 43 and panel or glue flap 74 are then returned to their normal flat position as illustrated in phantom lines in said Fig. 21. The blank is then prefolded, or the scores 39' and 16 broken, by raising the panels outwardly thereof on said scores 39' and 57 as clearly illustrated in Fig. 22. After said folding as in Fig. 22 the panels 42', 43, 60 and 61 are again returned to their flat or extended positions. The blank is then prefolded on the score or fold lines 29 and 30 as illustrated in Fig. 23 by having the portions of the blank outwardly of said scores raised to be normal to the remaining portion, main panel 27, of the blank. These panels, 41, 42', 43, 58, 59, 60 and 61, are then immediately returned to their normal extended positions.

It is at this time that the window opening covering material 72, if not previously done, is applied to the blank and it is at this time that the adhesive 73 is applied to the surface of the platform spacing panel 59 and the undersurface of the glue flap 61. The blank is now ready to be folded into the carton knocked-down position as above described, namely, folded on the score or fold line 55 to superimpose panels 59, 60 and 61 onto panels 58 and 27 and the blank further folded on score or fold line 29 to superimpose panels 41, 42' and 43 on the previously superimposed portions of the blank. The blank is now in the carton knocked-down condition as above described ready for erection by the user.

Pressure on the ends of the superimposed portions of the blank, the knocked-down carton, causes the parts to be readily brought to their operative positions as above described since the said score or bend or fold lines have been "prefolded" and they do not offer the resistance that is encountered in prior structures, and which prior structures generally require the use of an instrument to be inserted between superimposed panels to raise them from face contact to a spaced apart relation. It will be appreciated from the foregoing that each and every score, fold, or bend line on which the blank is to be bent in erecting the carton was bent previous to the actual setting up or erecting of the carton and that this prebending was either done deliberately and the parts returned to their normal position or the bending was accomplished in the act of folding portions of the blank onto other portions thereof in forming the knocked-down carton.

It will be understood that each of the various blanks is similarly treated for prefolding of the scores although certain scores in different blanks may not in each blank require this prefolding but only in certain blanks is it necessary.

From the foregoing, it will now be appreciated that there has been provided a box or carton formed of a single blank of foldable material having a front, a back, and end walls together with a cover and a platform intermediate the height of the walls for supporting or positioning goods within the box or carton, also a box or carton having all the aforesaid desirable elements, and wherein the said goods may be viewed from the top, from the top and rear, and from the top and front without opening said cover. It will further be noted that the box or carton is formed from a relatively simple blank yet having the parts thereof duly reinforced to withstand the stresses and strains to which it will be subjected in use.

What is claimed is:

1. A carton formed from a single blank comprising a bottom panel, a first extension from one side of the bottom panel, a second extension from the other side of the bottom panel, the first extension being subdivided to include a back wall panel, a panel forming the carton top and a panel forming a depending front flange from the top panel, the second extension being subdivided to include a front wall panel and a panel forming the carton platform to be disposed within the carton between the front and back walls and downwardly of the upper edges of said front and back walls, a glue flap in the second extension adapted to be attached to the back wall panel of the first extension so that said carton may be folded flat with the bottom panel, top panel, and platform panel superimposed on one another in carton knocked-down positions, said glue flap retaining the platform in position downwardly of the upper edges of said front and back walls upon erection of the carton, said first extension having an opening therethrough located wholly within the borders of said extension and without regard as to the panels thereof and said opening extending, in one direction, between points inwardly of the edges of the extension, and extending, in the other direction between points inwardly of the end of the extension and inwardly of the bottom panel that will not be below the platform when in carton erected position, and extensions from the remaining ends of the bottom panel subdivided into panels to provide end walls inner and outer wall members.

2. A carton formed from a single blank comprising a bottom panel, a first extension from one side of the bottom panel, a second extension from the other side of the bottom panel, the first extension being subdivided to include a back wall panel, a panel forming the carbon top and a panel forming a depending front flange from the top panel, the second extension being subdivided to include a front wall panel and a panel forming the carton platform to be disposed within the carton between the front and back walls and downwardly of the upper edges of said front and back walls, a glue flap in the second extension adapted to be attached to the back wall panel of the first extension so that said carton may be folded flat with the bottom panel, top panel, and platform panel superimposed on one another in carton knocked-down positions, said glue flap retaining the platform in position downwardly of the upper edges of said front and back walls upon erection of the carton, said first extension having an opening therethrough located wholly within the borders of said extension and without regard as to the panels thereof and said opening extending, in one direction, between points inwardly of the edges of the extension, and extending, in the other direction between points inwardly of the end of the extension and inwardly of the bottom panel that will not be below the platform when in carton erected position, extensions from the remaining ends of the bottom panel subdivided into panels to provide end walls inner and outer wall members, and corner pieces between adjacent ends of the front and back walls and the side walls outer wall members foldable on themselves, bellowswise, and extending transversely of the carton to be enfolded by the end walls inner and outer wall members.

3. A carton formed from a single blank comprising a bottom panel, a first extension from one side of the bottom panel, a second extension from the other side of the bottom panel, the first extension being subdivided to include a back wall panel, a panel forming the carton top and a panel forming a depending front flange from the top panel, the second extension being subdivided to include a front wall panel and a panel forming the carton platform to be disposed within the carton between the front and back walls and downwardly of the upper edges of said front and back walls, a glue flap in the second extension adapted to be attached to the back wall panel of the first extension so that said carton may be folded flat with the bottom panel, top panel, and platform panel superimposed on one another in carton knocked-down positions, said glue flap retaining the platform in position downwardly of the upper edges of said front and back walls upon erection of the carton, said first extension having an opening therethrough located wholly within the borders of said extension and without regard as to the panels thereof and said opening extending, in one direction, between points inwardly of the edges of the extension, and extending, in the other direction between points inwardly of the end of the extension and inwardly of the bottom panel that will not be below the platform when in carton erected position, extensions from the remaining ends of the bottom panel subdivided into panels to provide end walls inner and outer wall members, and a spacer panel in the second extension between the front wall panel and platform panel simultaneously hingedly connected to the adjacent edges of the front wall panel and platform panel for spacing the platform below the upper edge of the front wall.

4. A carton formed from a single blank comprising a bottom panel, a first extension from one side of the bottom panel, a second extension from the other side of the bottom panel, the first extension being subdivided to include a back wall panel and a panel forming the carton top, the second extension being subdivided to include a front wall panel and a panel forming the carton platform to be disposed within the carton between the front and back walls, a glue flap in the second extension adapted to be attached to the back wall panel of the first extension so that said carton may be folded flat with the bottom panel, top panel, and platform panel superimposed on one another in carton knocked-down positions, extensions from the remaining ends of the bottom panel subdivided into panels to provide end walls inner and outer wall members, and a spacer panel in the second extension between the front wall panel and platform panel simultaneously hingedly connected to the adjacent edges of the front wall panel and platform panel for spacing the platform below the upper edge of the front wall, said cover panel having an opening therethrough, and a transparent sheet carried by the cover panel across the opening therein to permit viewing of the interior of the carton when the cover panel is closed.

5. A carton formed from a single blank comprising a bottom panel, a first extension from one side of the bottom panel, a second extension from the other side of the bottom panel, the first extension being subdivided to include a back wall panel, a panel forming the carton top and a panel forming a depending front flange from the top panel, the second extension being subdivided to include a front wall panel and a panel forming the carton platform to be disposed within the carton between the front and back walls and downwardly of the upper edges of said front and back walls, a glue flap in the second extension adapted to be attached to the back wall panel of the first extension so that said carton may be folded flat with the bottom panel, top panel, and platform panel superimposed on one another in carton knocked-down positions, said glue flap retaining the platform in position downwardly of the upper edge of said back wall upon erection of the carton, extensions from the remaining ends of the bottom panel subdivided into panels to provide end walls inner and outer wall members, and a spacer panel in the second extension between the front wall panel and platform panel simultaneously hingedly connected to the adjacent edges of the front wall panel and platform panel for retaining the platform downwardly of the upper edge of the front wall, said cover panel and back panel being provided with an opening therethrough with said opening in the back panel extending downwardly from the upper end of said back panel a distance not to exceed the spacing of the platform below the upper edge of the front wall.

6. A carton formed from a single blank comprising a bottom panel, a first extension from one side of the bottom panel, a second extension from the other side of the bottom panel, the first extension being subdivided to include a back wall panel, a panel forming the carton top and a panel forming a depending front flange from the top panel, the second extension being subdivided to include a front wall panel and a panel forming the carton platform to be disposed within the carton between the front and back walls and downwardly of the upper edges of said front and back walls, a glue flap in the second extension adapted to be attached to the back wall panel of the first extension so that said carton may be folded flat with the bottom panel, top panel, and platform panel superimposed on one another in carton knocked-down positions, said glue flap retaining the platform in position downwardly of the upper edge of said back wall upon erection of the carton extensions from the remaining ends of the bottom panel subdivided into panels to provide end walls inner and outer wall members, corner pieces between adjacent ends of the front and back walls and the side walls outer wall members foldable on themselves, bellowswise, and extending transversely of the carton to be enfolded by the end walls inner and outer wall members, said platform panel being adapted to be located intermediate the upper and lower ends of the front and back walls, the cover panel having a depending front flange integrally, hingedly connected therewith, said cover panel and one of said back wall and cover front flange having formed therethrough an opening which crosses the hinge line of said cover panel between the one of the said back wall and cover front flange having the opening therein, said opening extending into the one of said back panel and cover front flange a distance from the said hinge line no greater than the distance that the platform panel is below the upper ends of the front and back walls, and a transparent sheet secured over said opening whereby the interior of the carton may be viewed through the top and through one of the front and back walls.

7. A carton formed from a single blank comprising a bottom panel, a first extension from one side of the bottom panel, a second extension from the other side of the bottom panel, the first extension being subdivided to include a back wall panel, a panel forming the carton top and a panel forming a depending front flange from the top panel, the second extension being subdivided to include a front wall panel and a panel forming the carton platform, said second extension further including a spacing panel between the front panel wall panel and platform panel and simultaneously integrally, hingedly connected with adjacent edges of said front wall panel and platform panel, a glue flap at the end of the second extension adapted to be secured to the back wall panel, said spacing panel and glue flap together effecting the positioning of the platform intermediate the upper and lower ends of the front and back walls, said back wall panel and cover panel having formed therethrough an opening with said opening extending downwardly from the top of the back wall panel a distance not exceeding the distance the platform is located below the top edge of the front wall, a transparent sheet secured to the cover panel and back wall to overlay the opening therein so that the carton when erected may be viewed through the top and back of the carton, and extensions from the remaining ends of the bottom panel subdivided into panels to provide end walls inner and outer wall members.

8. A carton formed from a single blank comprising a bottom panel, a first extension from one side of the bottom panel, a second extension from the other side of the bottom panel, the first extension being subdivided to include a back wall panel, a panel forming the carton top and a panel forming a depending front flange from the top panel, the second extension being subdivided to include a front wall panel and a panel forming the carton platform, said second extension further including a spacing panel between the front wall panel and platform panel and simultaneously integrally, hingedly connected with adjacent edges of said front wall panel and platform panel, a glue flap at the end of the second extension adapted to be secured to the back wall panel, said spacing panel and glue flap together effecting the positioning of the platform intermediate the upper and lower ends of the front and back walls, said back wall panel and cover panel having formed therethrough an opening with said opening extending downwardly from the top of the back wall panel a distance not exceeding the distance the platform is located below the top edge of the front wall, a transparent sheet secured to the cover panel and back wall to overlay the opening therein so that the carton when erected may be viewed through the top and back of the carton, extensions from the remaining ends of the bottom panel subdivided into panels to provide end walls inner and outer wall members, and corner pieces between adjacent edges of the back and front walls and end walls outer wall members adapted to be folded on themselves, bellowswise, and disposed transversely of the carton bottom panel between the end walls inner and outer wall members.

9. A carton formed from a single blank comprising a bottom panel, a first extension from one side of the bottom panel, a second extension from the other side of the bottom panel, the first extension being subdivided to include a back wall panel, a panel forming the carton top and a panel forming a depending front flange from the top panel, the second extension being subdivided to include a front wall panel and a panel forming the carton platform, said second extension further including a spacing panel between the front wall panel and platform panel and simultaneously integrally, hingedly connected with adjacent edges of said front wall panel and platform panel, a glue flap at the end of the second extension adapted to be secured to the back wall panel, said spacing panel and glue flap together effecting the positioning of the platform intermediate the upper and lower ends of the front and back walls, said back wall panel and cover panel having formed therethrough an opening with said opening extending downwardly from the top of the back wall panel a distance not exceeding the distance the platform is located below the top edge of the front wall, a transparent sheet secured to the cover panel and back wall to overlay the opening therein so that the carton when erected may be viewed through the top and back of the carton, extensions from the remaining ends of the bottom panel subdivided into panels to provide end walls inner and outer wall members, corner pieces between adjacent edges of the back and front walls and end walls outer wall members adapted to be folded on themselves, bellowswise, and disposed transversely of the carton bottom panel between the end walls inner and outer wall members, depending front and end flanges on the cover panel adapted to be disposed interiorly of the carton when the cover is closed, and a tongue integral with the cover panel cut from the front flange for engagement with the carton front wall to limit the closing of the carton cover panel.

References Cited in the file of this patent

UNITED STATES PATENTS

| Number | Name | Date |
|---|---|---|
| 159,684 | Kettle | Feb. 9, 1875 |
| 520,341 | Sherman | May 22, 1894 |
| 1,352,759 | Markert | Sept. 14, 1920 |
| 1,694,126 | Joslin | Dec. 4, 1928 |
| 2,308,818 | Levkoff | Jan. 19, 1943 |
| 2,316,261 | Levkoff | Apr. 13, 1943 |
| 2,355,206 | Davidson | Aug. 8, 1944 |
| 2,375,843 | Gottlieb | May 15, 1945 |
| 2,409,736 | Caimi | Oct. 22, 1946 |
| 2,494,234 | Frankenstein | Jan. 10, 1950 |
| 2,587,828 | Fogel | Mar. 4, 1952 |
| 2,589,944 | Labombarde | Mar. 18, 1952 |
| 2,655,082 | Amyx | Oct. 13, 1953 |
| 2,670,125 | Frankenstein | Feb. 23, 1954 |
| 2,717,115 | Vines | Sept. 6, 1955 |